(12) United States Patent
Yamashita

(10) Patent No.: US 9,285,663 B2
(45) Date of Patent: Mar. 15, 2016

(54) PROJECTION DISPLAY DEVICE HAVING LIGHT SOURCE WITH PLURALITY OF PORT GROUPS EACH HAVING OPENING AND CLOSING PLATE

(75) Inventor: Eisuke Yamashita, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 220 days.

(21) Appl. No.: 14/002,091

(22) PCT Filed: Mar. 15, 2011

(86) PCT No.: PCT/JP2011/056018
§ 371 (c)(1),
(2), (4) Date: Aug. 28, 2013

(87) PCT Pub. No.: WO2012/124053
PCT Pub. Date: Sep. 20, 2012

(65) Prior Publication Data
US 2013/0329195 A1    Dec. 12, 2013

(51) Int. Cl.
*G03B 21/16*    (2006.01)
*H04N 9/31*    (2006.01)
*H01J 7/24*    (2006.01)
(Continued)

(52) U.S. Cl.
CPC . *G03B 21/16* (2013.01); *F21V 7/00* (2013.01); *G03B 21/2026* (2013.01); *H01J 7/24* (2013.01); *H01J 61/523* (2013.01); *H04N 9/315* (2013.01); *H04N 9/3144* (2013.01)

(58) Field of Classification Search
CPC ......... G03B 21/16; H04N 9/3144; H01J 7/24; H01J 61/52; H01J 61/523; H01J 61/526

USPC ....................................... 353/52–61; 362/294
See application file for complete search history.

(56) References Cited

U.S. PATENT DOCUMENTS 7,179,048 B2 *    2/2007    Huang et al. .................. 415/126
7,210,825 B2 *    5/2007    Watanabe et al. ............. 362/373
(Continued)

FOREIGN PATENT DOCUMENTS

CN    101639614 A    2/2010
JP    2005-024735 A    1/2005
(Continued)

OTHER PUBLICATIONS

Chinese Office Action dated Dec. 9, 2014 with a partial English translation thereof.
(Continued)

*Primary Examiner* — William C Dowling
(74) *Attorney, Agent, or Firm* — McGinn IP Law Group, PLLC

(57) ABSTRACT

A light source device includes a holder for holding a lamp unit, a duct member placed over the holder, a flow path formed between the holder and the duct member, a plurality of port groups disposed in the holder, each port group including ports for connecting the inside of a reflector of the lamp unit to the flow path, and a plate member disposed in each port group and configured to selectively open/close ports included in each port group. The plurality of port groups is located around the center axis of a light-emitting tube of the lamp unit, and the plate member rotates under its own weight to open some of the ports included in the port group while closing the other ports.

7 Claims, 22 Drawing Sheets

(51) Int. Cl.
  *H01J 61/52* (2006.01)
  *G03B 21/20* (2006.01)
  *F21V 7/00* (2006.01)

(56) References Cited

U.S. PATENT DOCUMENTS

| | | | | |
|---|---|---|---|---|
| 8,011,788 | B2 * | 9/2011 | Chang | 353/52 |
| 8,132,924 | B2 * | 3/2012 | Nishi et al. | 353/61 |
| 8,506,088 | B2 * | 8/2013 | Liao | 353/61 |
| 8,511,834 | B2 * | 8/2013 | Kobayashi et al. | 353/61 |
| 8,641,201 | B2 * | 2/2014 | Ko et al. | 353/57 |
| 2010/0026965 | A1 | 2/2010 | Namba et al. | |
| 2010/0103382 | A1 * | 4/2010 | Onodera et al. | 353/52 |
| 2010/0253924 | A1 | 10/2010 | Nishi et al. | |
| 2011/0194080 | A1 * | 8/2011 | Hoshino et al. | 353/57 |
| 2012/0086919 | A1 * | 4/2012 | Lin et al. | 353/61 |
| 2013/0314673 | A1 * | 11/2013 | Tateno | 353/57 |

FOREIGN PATENT DOCUMENTS

| | | |
|---|---|---|
| JP | 2007-041220 A | 2/2007 |
| JP | 2007-264247 A | 10/2007 |
| JP | 2008-059930 A | 3/2008 |
| JP | 2008-203450 A | 9/2008 |
| JP | 2008-262064 A | 10/2008 |
| JP | 2010-32944 A | 2/2010 |
| JP | 2010-078973 A | 4/2010 |
| JP | 2010-244753 A | 10/2010 |
| WO | WO 2010/050048 A1 | 5/2010 |

OTHER PUBLICATIONS

Japanese Office Action dated Jul. 31, 2014 with a partial English translation thereof.

International Search Report dated Apr. 26, 2011 in PCT/JP2011/056018, with English translation thereof.

* cited by examiner

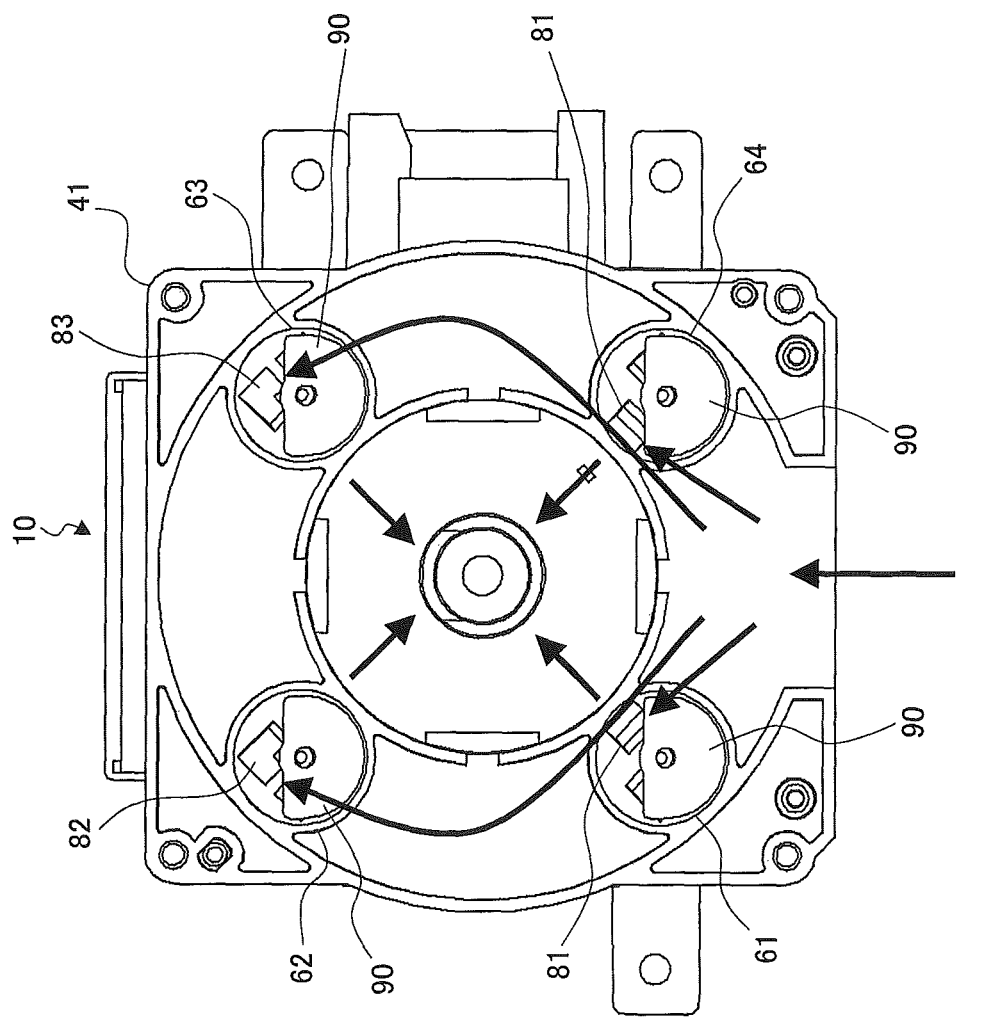

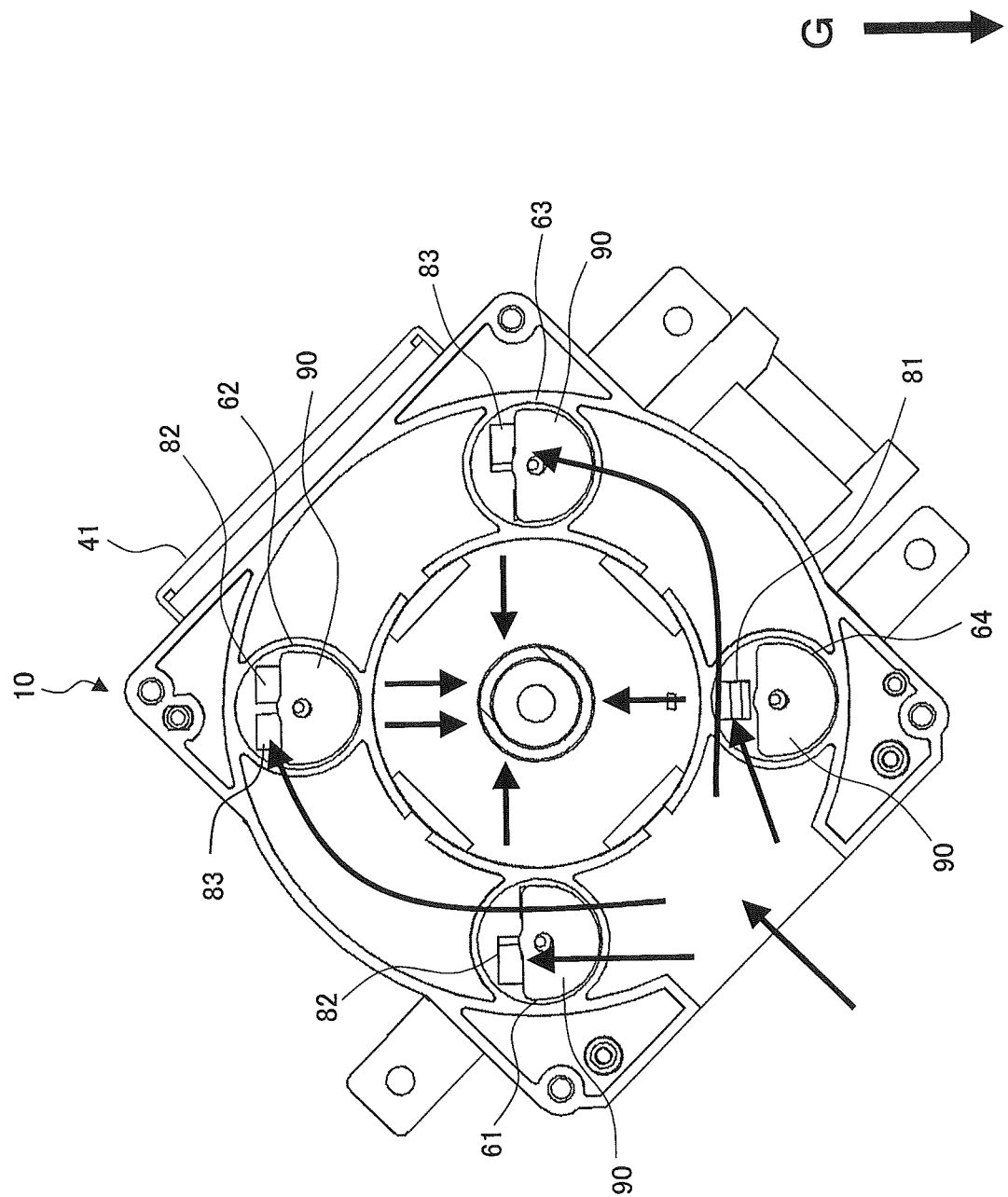

PROJECTION DISPLAY DEVICE HAVING LIGHT SOURCE WITH PLURALITY OF PORT GROUPS EACH HAVING OPENING AND CLOSING PLATE

TECHNICAL FIELD

The present invention relates to a light source, and more particularly to the cooling mechanism of the light source.

BACKGROUND ART

For the light source of a projection display device, a discharge lamp such as a high-pressure mercury lamp, a metal halide lamp, or a xenon lamp is used. Such a discharge lamp emits light by arc discharge generated in a light-emitting tube. The light-emitting tube includes a roughly spherical light-emitting unit (valve), a pair of rod-shaped sealing units, and a pair of opposing electrodes. The rear ends of the electrodes are held by the sealing units, and leading ends are arranged in the valve. Further, in the sealing units, foil conductive members connected to the rear ends of the electrodes are included.

When an arc discharge occurs between the pair of electrodes, an arc (electric arc) extends in a direction opposite the direction of gravity. Accordingly, the temperature of the gravity-direction upper portion of the valve is higher than that of the same-direction lower portion of the valve. Thus, even when the upper portion and the lower portion of the valve are uniformly cooled, the temperature of the entire valve cannot be maintained uniform. However, to maintain an appropriate light-emitting state, it is important to maintain the temperature of the entire valve as uniform as possible. This is because when the temperature of the valve is higher than a predetermined temperature, clouding occurs to shorten the life of the discharge lamp. On the other hand, when the temperature of the valve is lower than the predetermined temperature, luminance reduction, flickering, or blackening occurs. The life of the discharge lamp is shortened when the blackening occurs. Further, when the temperature of a contact portion between the sealing unit and the conductive member is higher than an optimum temperature, oxidation of the conductive member is expedited, causing rupture of the light-emitting tube or a lighting failure.

The projection display device is installed in various postures in various places. For example, the projection display device may be installed on a floor or a table (first installation state). The projection display device may be suspended from a ceiling (second installation state). In the first installation state, the projection display device may be installed not only parallel to the floor but also vertical to the floor, or inclined.

In the second installation state, the projection display device may be suspended not only parallel to the ceiling but also vertical to the ceiling, or inclined with respect to the ceiling.

When the posture of the projection display device changes as described above, the posture of the light source (discharge lamp) included in the device also changes. The changed posture of the discharge lamp causes changing of the positions of the high-temperature portion and the low-temperature portion on the discharge lamp (valve). For example, the positions of the high-temperature portion and the low-temperature portion on the valve are different by 180° between when the projection display device is installed parallel to the floor and when it is suspended parallel to the ceiling. The positions of the high-temperature portion and the low-temperature portion on the valve are different by 90° between when the projection display device is installed parallel to the floor and when it is installed vertical to the floor. Thus, the temperature of the entire valve cannot be maintained uniform even when only one specific place on the valve is cooled.

Patent Literature 1 describes a light source device that includes a first duct for supplying cooling air to the gravity-direction upper portion of the valve when the projection display device is in the first installation state, and a second duct for supplying the cooling air to the gravity-direction upper portion of the valve when the projection display device is in the second installation state. In this light source device, at the inlets of the first duct and the second duct facing a fan, shielding members are arranged to reciprocate under their own weights. When the projection display device is in the first installation state, the inlet of the first duct is opened, while the inlet of the second duct is closed by the shielding member. On the other hand, when the projection display device is in the second installation state, the inlet of the second duct is opened, while the inlet of the first duct is closed by the shielding member.

Patent Literature 2 describes a light source device configured such that cooling air circulates inside a reflector surrounding a light-emitting tube.

CITATION LIST

Patent Literature 1: JP2005-24735A
Patent Literature 2: JP2008-59930A

SUMMARY OF INVENTION

Problems to be Solved

The light source device described in Patent Literature 1 does not function when the projection display device is installed in a posture where the shielding member does not reciprocate under its own weight. For example, when the projection display device is installed vertical to the floor or suspended vertical to the ceiling, the shielding member does not move, nor duct switching is performed. Since the light source device described in Patent Literature 1 needs two ducts, miniaturization of the device is difficult.

In the light source device described in Patent Literature 2, since the entire light-emitting tube is uniformly cooled, a temperature difference between the gravity-direction upper portion of the valve and the same-direction lower portion is not eliminated.

Solution to Problem

According to the present invention, there is provided a light source device including a lamp unit that includes a light-emitting tube for emitting light by arc discharge and a reflector surrounding the light-emitting tube. The light source device includes: a holder that closes an opening of the reflector and holds the lamp unit; a duct member placed over a front face of the holder; a flow path which is formed between the front face of the holder and a rear surface of the duct member and through which cooling air is supplied; a plurality of port groups disposed in the holder, each port group including two or more ports for connecting the inside of the reflector with the flow path; and a plate member disposed in each port group and configured to selectively open/close the two or more ports included in each port group. The plurality of port groups is located around a center axis of the light-emitting tube to surround the center axis. The plate member rotates under its own weight according to a posture change of the light source device to open some of the two or more ports included in the port group while closing the other ports.

According to the present invention, there is provided a projection display device that includes the light source device of the invention.

Effects of Invention

According to the present invention, irrespective of the posture of the light source device or the projection display device, the temperature of the entire light-emitting tube is maintained almost constant.

BRIEF DESCRIPTION OF DRAWINGS

FIG. 21 is a plan view showing the opened/closed state of the port when the rotational angle of the projection display device is 270°.

FIG. 22 is a plan view showing the opened/closed state of the port when the rotational angle of the projection display device is 315°.

DESCRIPTION OF EMBODIMENTS

Figure 1:
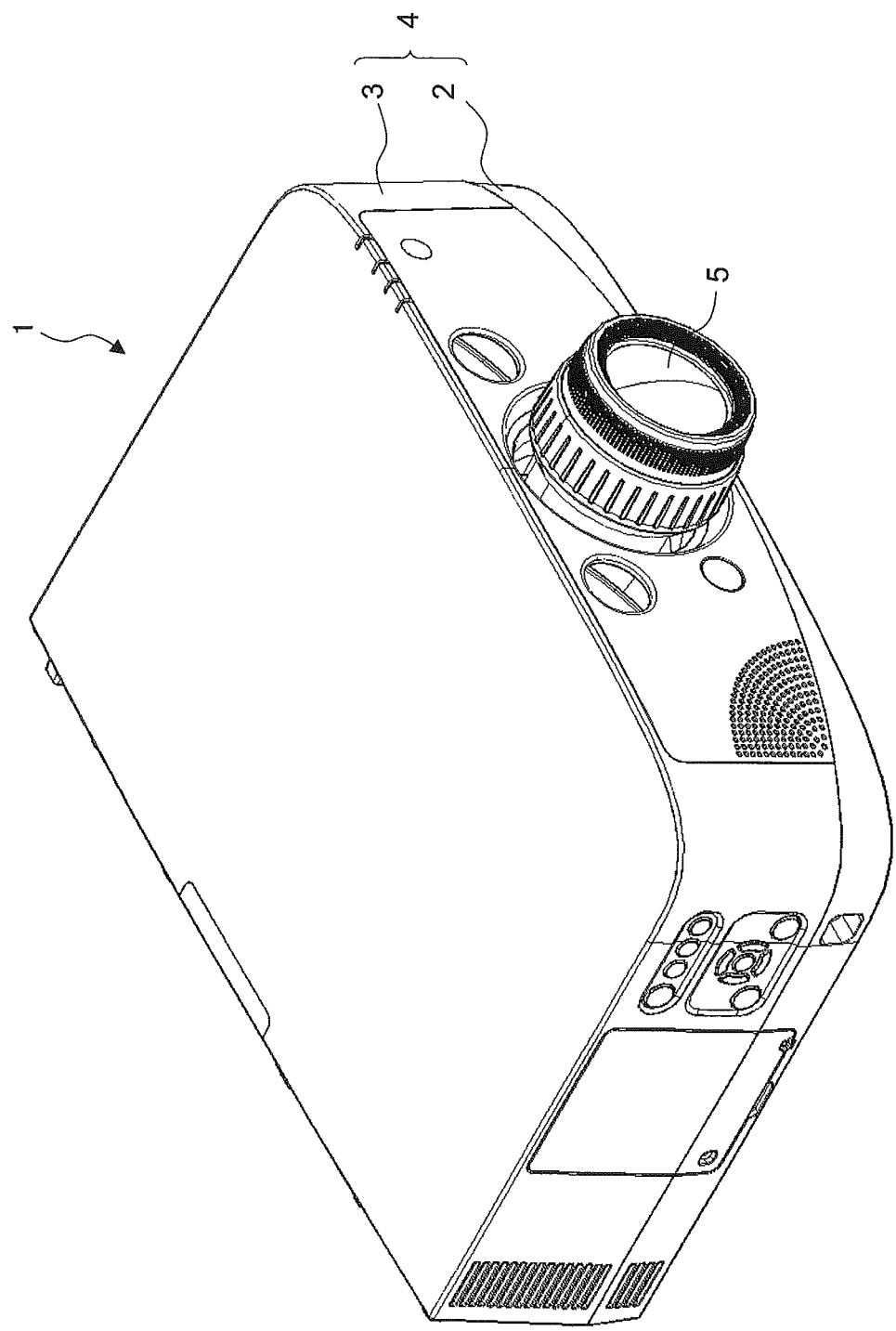
FIG. 1 is an appearance perspective view showing a projection display device.
Figure 2:
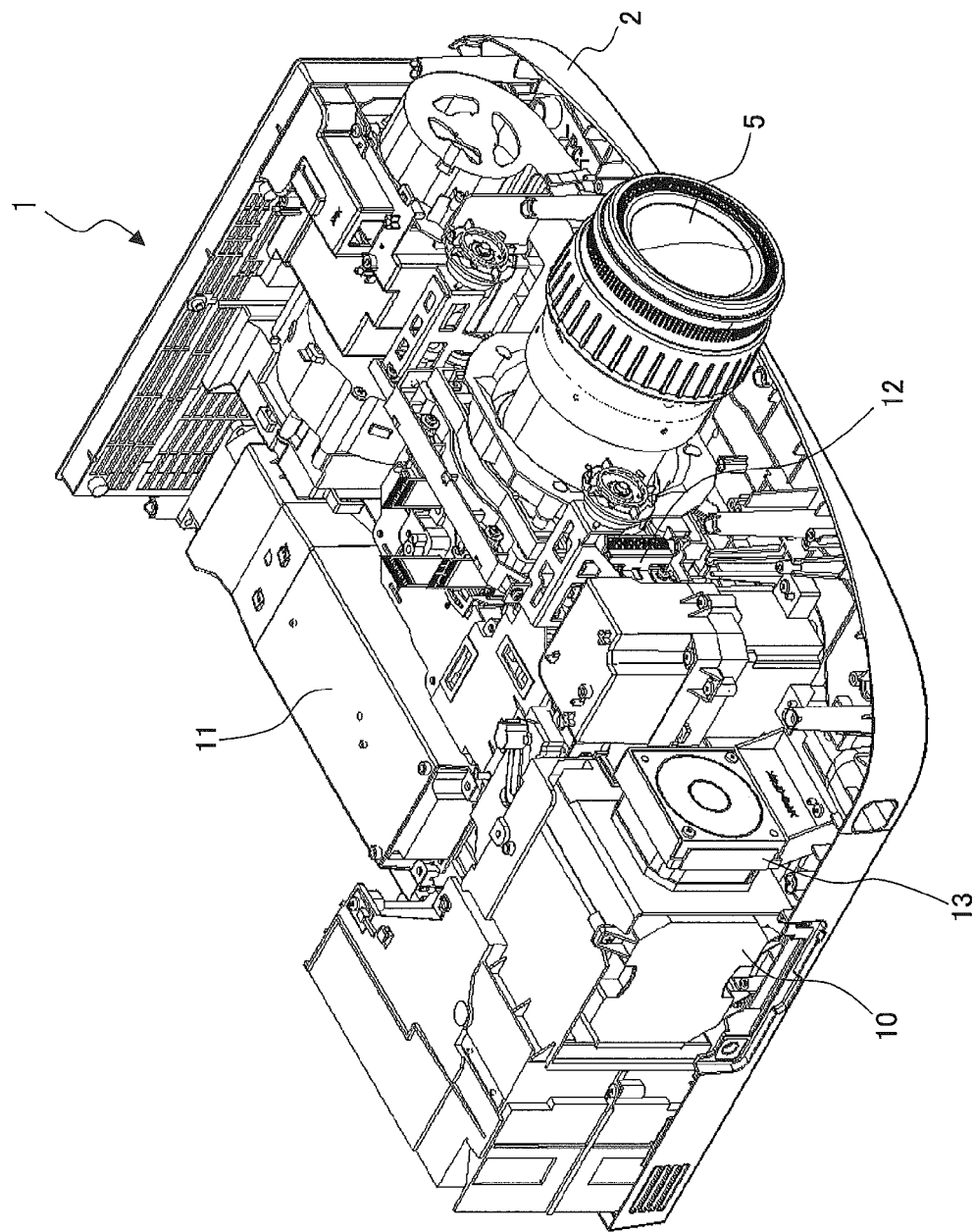
FIG. 2 is a perspective view showing the internal structure of the projection display device.

Next, the first embodiment of the present invention will be described referring to the drawings. FIG. 1 is an appearance perspective view showing projection display device 1 according to the present invention. FIG. 2 is a perspective view showing the main internal structure of projection display device 1.

As shown in FIG. 1, projection display device 1 includes case 4 that includes lower cover 2 and upper cover 3, and projection lens 5 is disposed in the front face of case 4.

Figure 3A:
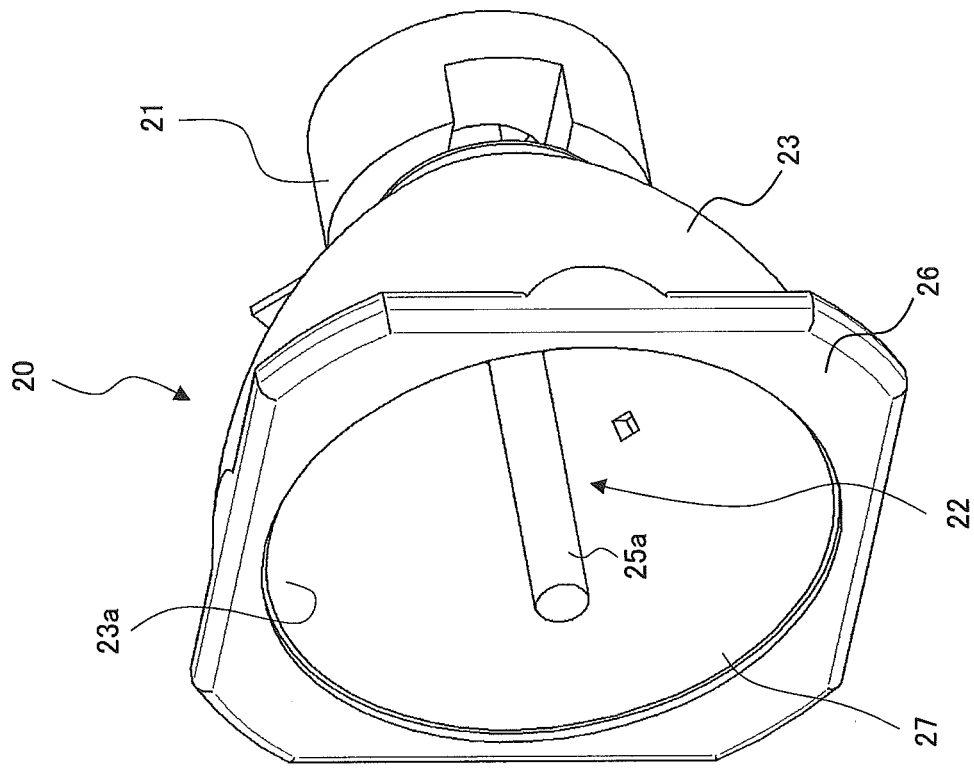
FIG. 3A is a perspective view showing a lamp unit.
Figure 3B:
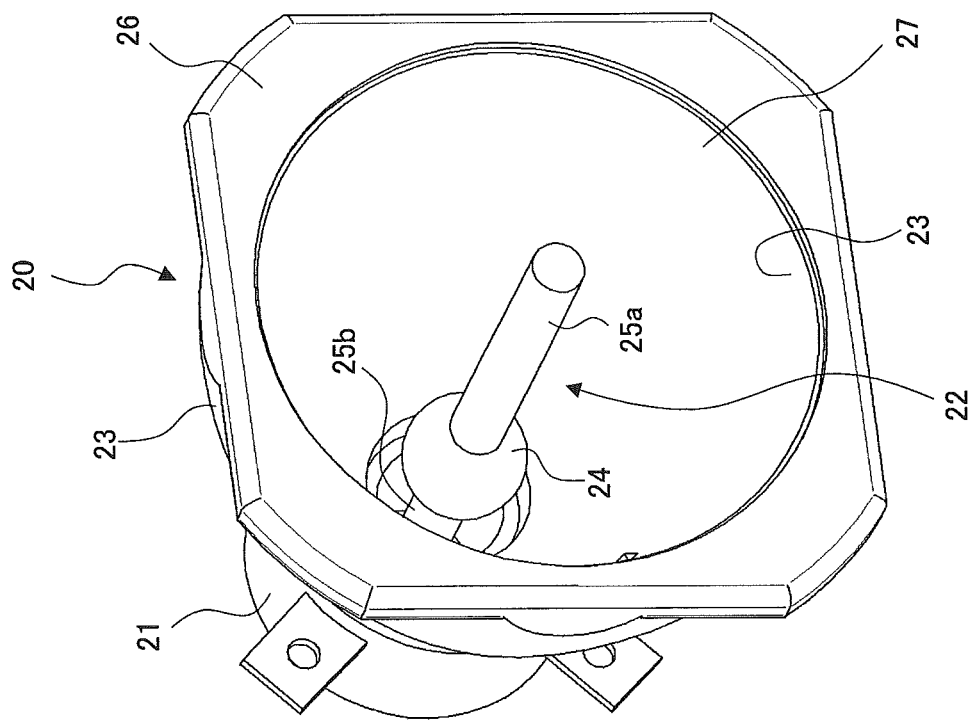
FIG. 3B is another perspective view showing the lamp unit.

As shown in FIG. 2, projection display device 1 includes lamp box 10, optical engine 11, and blower 12. In lamp box 10, lamp unit 20 shown in FIGS. 3A and 3B is housed. Light emitted from lamp unit 20 is passed through optical engine 11 and then output via projection lens 5. Optical engine 11 includes a plurality of optical elements, and the light entered into optical engine 11 is subjected to various optical processes during its passage through the optical elements.

As shown in FIGS. 3A and 3B, lamp unit 20 includes reflector base 21, light-emitting tube 22 held by reflector base 21, and reflector 23 extending from reflector base 21 to spread toward the bottom and to surround light-emitting tube 22. Light-emitting tube 22 includes a roughly spherical light-emitting unit (valve 24), rod-shaped sealing units 25a and 25b extending in opposing directions from valve 24, and a pair of opposing electrodes (not shown). The rear ends of the electrodes are held by sealing units 25a and 25b, and leading ends are located in valve 24. In sealing units 25a and 25b, foil conductive members (not shown) connected to the rear ends of the electrodes are included. Light-emitting tube 22 (sealing unit 25b) is fixed to reflector base 21 by an adhesive mainly made of an inorganic material.

Reflection surface 23a of reflector 23 is an elliptic rotation surface. Valve 24 of light-emitting tube 22 is located on a first focus on the rotationally symmetrical axis of reflection surface 23a. Reflection surface 23a condenses light emitted from light-emitting tube 22 on a second focus on the rotationally symmetrical axis. The emission direction of light from lamp box 10 shown in FIG. 2 and the emission direction of light from projection lens 5 are different from each other by 90°. In other words, the center axis of light-emitting tube 22 and the rotationally symmetrical axis of reflection surface 23a coincide with each other, and the rotationally symmetrical axis of reflection surface 23a is orthogonal to the optical axis of projection lens 5.

As described above, an arc generated in valve 24 of light-emitting tube 22 extends in a direction opposite the direction of gravity. For example, when lamp unit 20 is in a posture shown in FIG. 3A, the arc extends upward on a paper surface shown in FIG. 3A. Accordingly, the temperature of the gravity-direction upper portion of valve 24 is higher than that of the same-direction lower portion. Hereinafter, the gravity-direction upper portion of valve 24 is referred to as a "valve upper portion", and the gravity-direction lower portion of valve 24 is referred to as a "valve lower portion". In other words, the vertical-direction upper portion of valve 24 is referred to as a "valve upper portion", and the vertical-direction lower portion of valve 24 is referred to as a "valve lower portion". However, the portions of valve 24 respectively equivalent to a valve upper portion and a valve lower portion change according to the posture of lamp unit 20 (projection display device 1). For example, a portion that is a valve upper portion in a certain posture is a valve lower portion in the other posture. A portion that is a valve upper portion in a certain posture is neither a valve upper portion nor a valve lower portion in the other posture.

Figure 4:
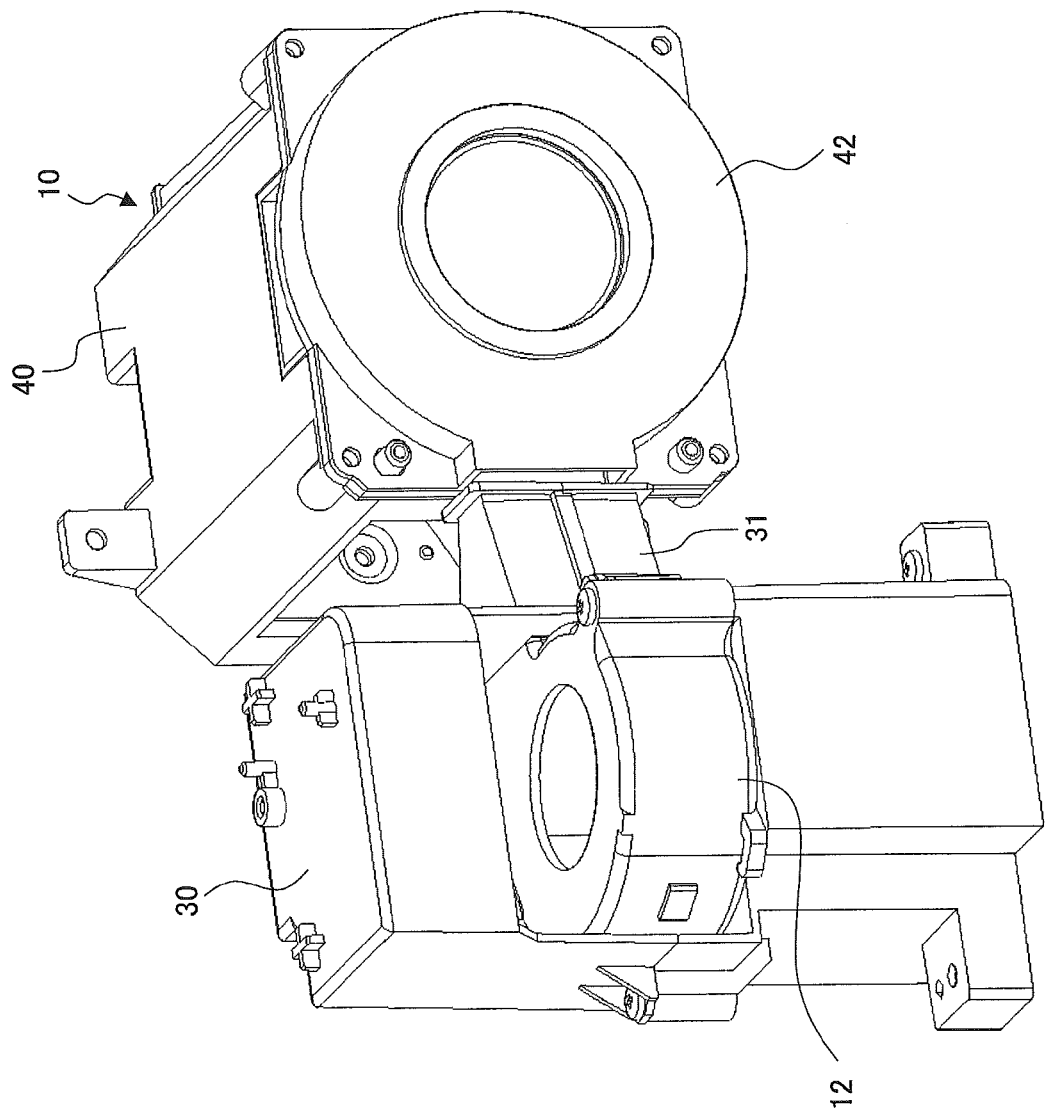
FIG. 4 is a perspective view showing a lamp box and a blower.

FIG. 4 is a perspective view showing lamp box 10 and blower 12. In the present embodiment, blower 12 is a sirocco fan. However, not limited to the sirocco fan, blower 12 can be, for example, an axial fan. Sirocco fan 12 is held by box structure 30. Cooling air blown from sirocco fan 12 flows through a flow path (not shown) formed in structure 30 and connection flow path 31 for connecting structure 30 and lamp box 10 into lamp box 10. The cooling air entered into lamp box 10 mainly cools light-emitting tube 22 (FIGS. 3A and 3B).

Figure 5B:
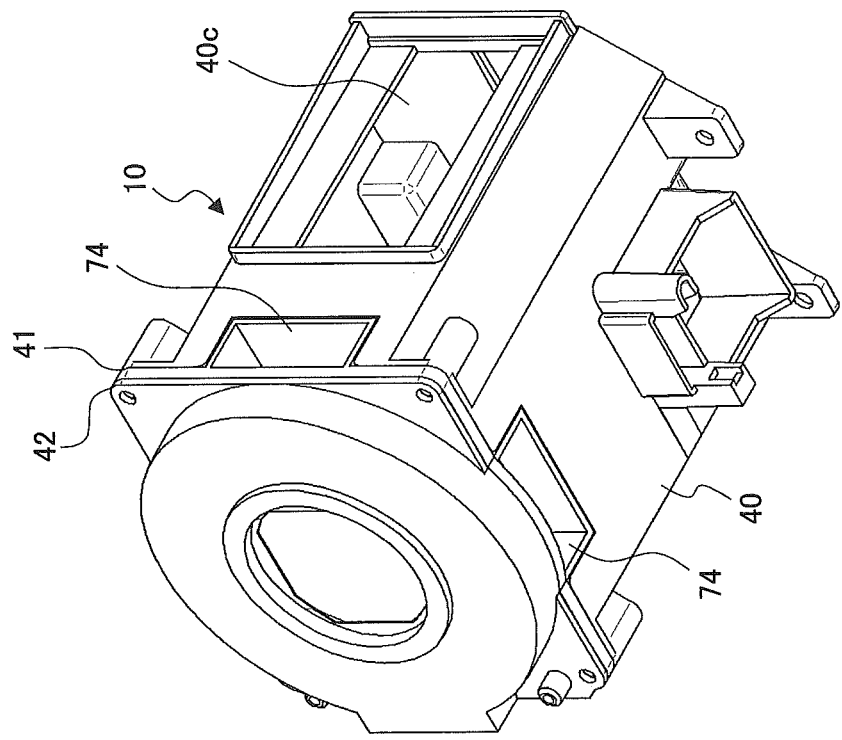
FIG. 5B is another perspective view showing the lamp box.
Figure 5A:
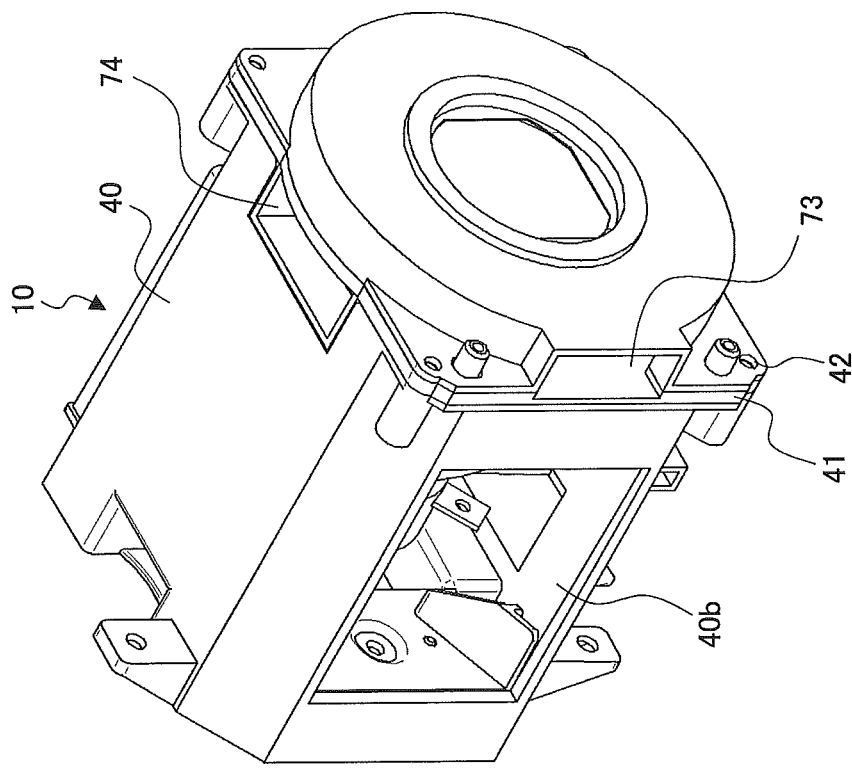
FIG. 5A is a perspective view showing the lamp box.
Figure 6:
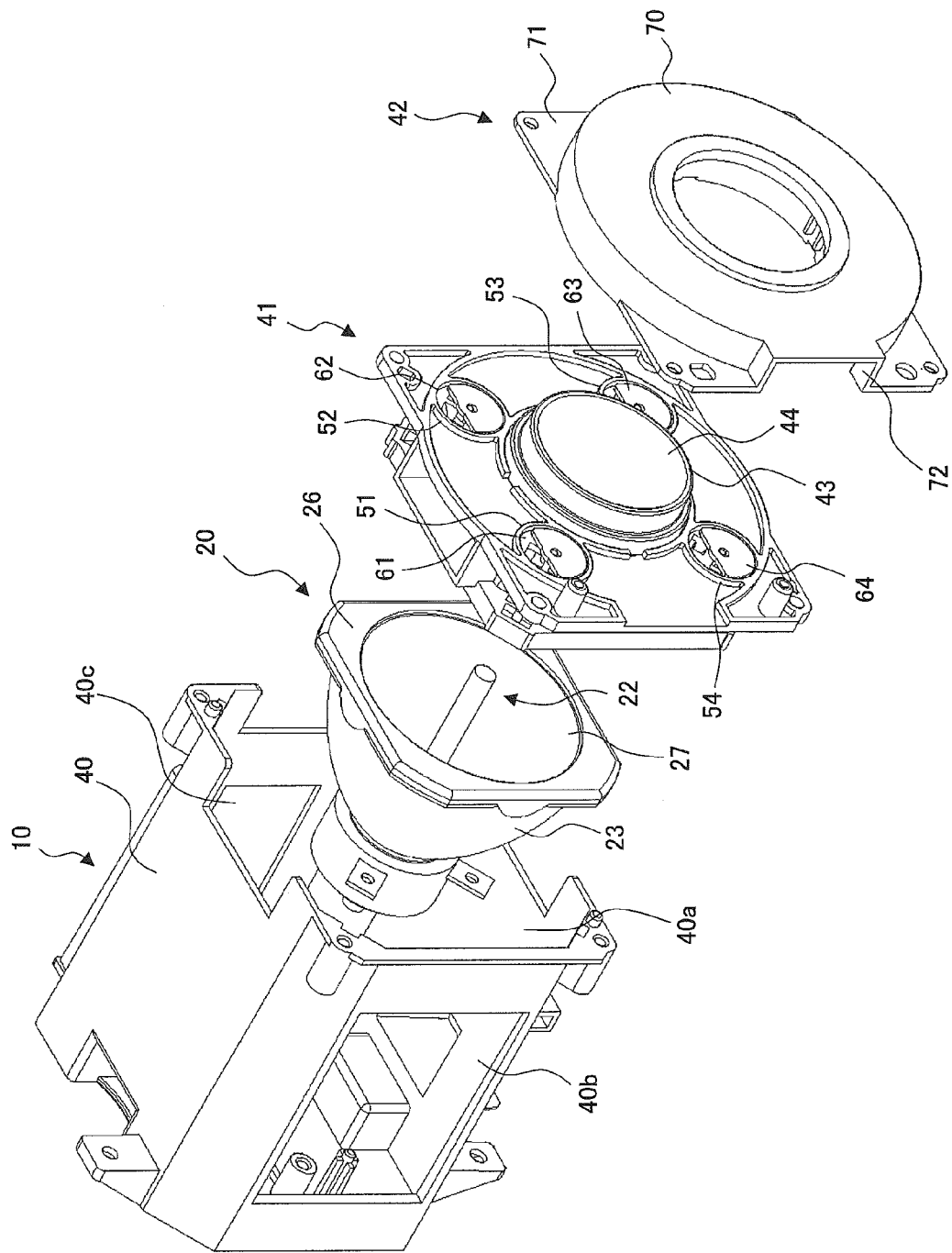
FIG. 6 is an exploded perspective view showing the lamp box.

FIGS. 5A and 5B are perspective views showing lamp box 10. FIG. 6 is an exploded perspective view showing lamp box 10. Lamp box 10 includes roughly rectangular parallelepiped body 40 that houses lamp unit 20, holder 41 placed over opening 40a of body 40, and duct member 42 placed over holder 41. Second opening 40b and third opening 40c are respectively formed in the opposing side walls of body 40. Second blower 13 (FIG. 2) is disposed in second opening 40b. Cooling air blown from second blower 13 mainly cools reflector 23, and flows out from third opening 40c.

Flange 26 extending from reflector 23 abuts on the rear surface of holder 41. In other words, opening 27 of reflector 23 of lamp unit 20 is covered with holder 41. However, in the center of holder 41, circular window 43 is formed to take out light emitted from lamp unit 20, and explosion-proof glass 44 is fitted in window 43.

Further, in the front face of holder 41, four roughly ring-shaped ribs 51 to 54 are formed to surround window 43. Specifically, ribs 51 to 54 are arranged at equal intervals (intervals of) 90° on a circular arc around the center of window 43. Hereinafter, a circular region surrounded with rib 51 is referred to as first region 61. Similarly, a circular region surrounded with rib 52, a circular region surrounded with rib 53, and a circular region surrounded with rib 54 are respectively referred to as second region 62, third region 63, and fourth region 64. It is obvious that regions 61 to 64 are arranged at equal intervals (intervals of 90°) on the circular arc around the center of window 43.

Duct member 42 is placed (stacked) over the front face of holder 41 having the aforementioned structure. Duct member 42 includes doughnut-shaped flow path forming unit 70 having a circular opening to expose window 43 of holder 41, and flange 71 extending from flow path forming unit 70. In flange 71, through-holes are formed to communicate with through-holes formed at the four corners of holder 41. Holder 41 and duct member 42 are fixed to the edge of opening 40a of body 40 by screws (not shown) inserted into the connected through-holes.

Annular flow path 75 (FIG. 10) is formed between holder 41 and duct member 42 (flow path forming unit 70) stacked together as described above. In one side of duct member 42, opening 72 is formed to communicate with annular flow path 75. Accordingly, as shown in FIG. 5A, when duct member 42 and holder 41 are fixed to body 40, in one side of opening 40a of body 40, inlet 73 is formed to communicate with annular flow path 72. Notches are formed in the three sides of opening 40a of body 40. Accordingly, when duct member 42 and holder 41 are fixed to body 40, in the three sides of opening 40a of body 40, outlets 74 are formed to communicate with the internal space of body 40.

Regions 61 to 64 in holder 41 are located in annular flow path 75 formed between holder 41 and duct member 42. Each region includes a plurality of ports and a plate member for selectively opening/closing the ports. Thus, cooling air entered into annular flow path 75 from inlet 73 shown in FIG. 5A flows into body 41 via the opened port to cool light-emitting tube 22. Then, the cooling air flows out of body 40 (lamp box 10) via outlets 74 shown in FIGS. 5A and 5B. Connection flow path 31 shown in FIG. 4 is connected to inlet 74, and air blown from sirocco fan 12 flows as cooling air into annular flow path 75.

Hereinafter, the port and the plate member included in each of regions 61 to 64 of holder 41 will be described in detail. The ports and the plate members are similar in shape, structure and configuration among the regions. Only the port and the plate member in first region 61 shown in FIG. 6 will be described.

Figure 7:
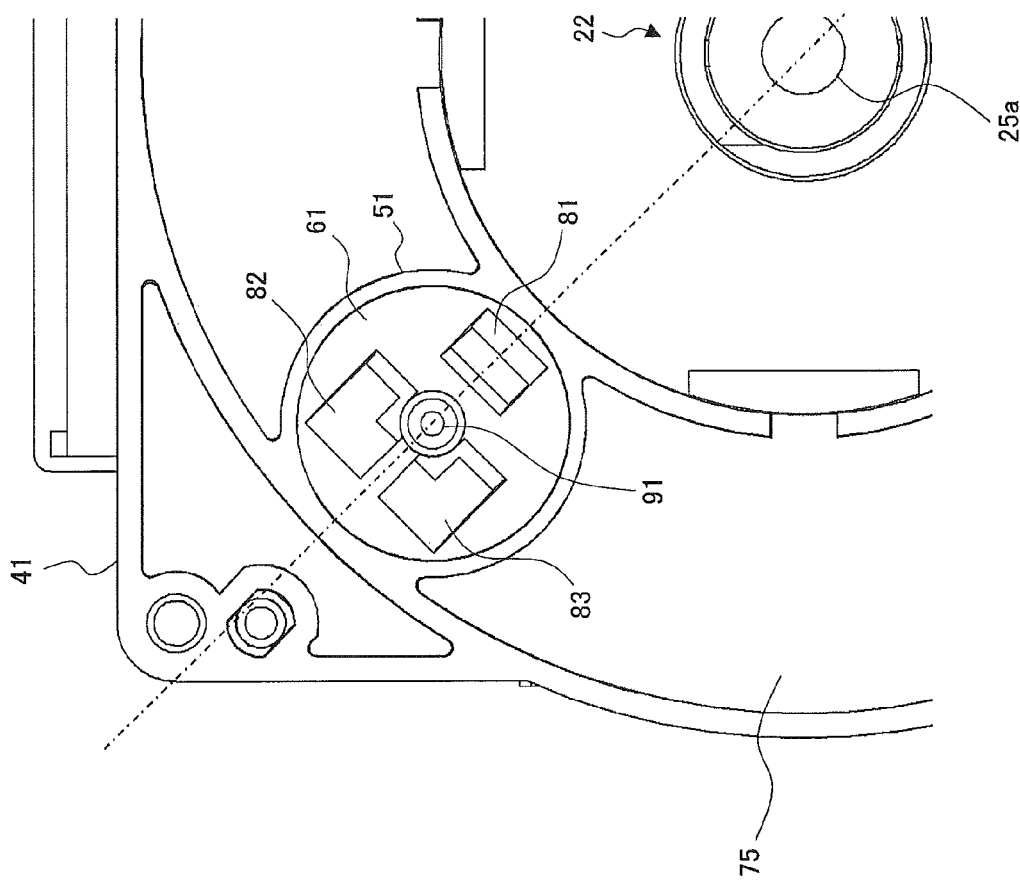
FIG. 7 is an enlarged view showing a first region where a plate member is omitted and its surroundings.

FIG. 7 is an enlarged view showing first region 61 and its surroundings. In region 61, a port group including first port 81, second port 82, and third port 83 connected with the inside of reflector 23 of lamp unit 20 is formed. Cooling air entered from first port 81 is guided by the flow rectifying plate described below to mainly flow toward sealing unit 25a of light-emitting tube 22. On the other hand, cooling air entered from second port 82 and third port 83 is guided by the flow rectifying plate to mainly flow toward valve 24 of light-emitting tube 22. Thus, hereinafter, first port 81, second port 82, and third port 83 are respectively referred to as "sealing unit port 81", "valve port 82", and "valve port 83".

Figure 8:
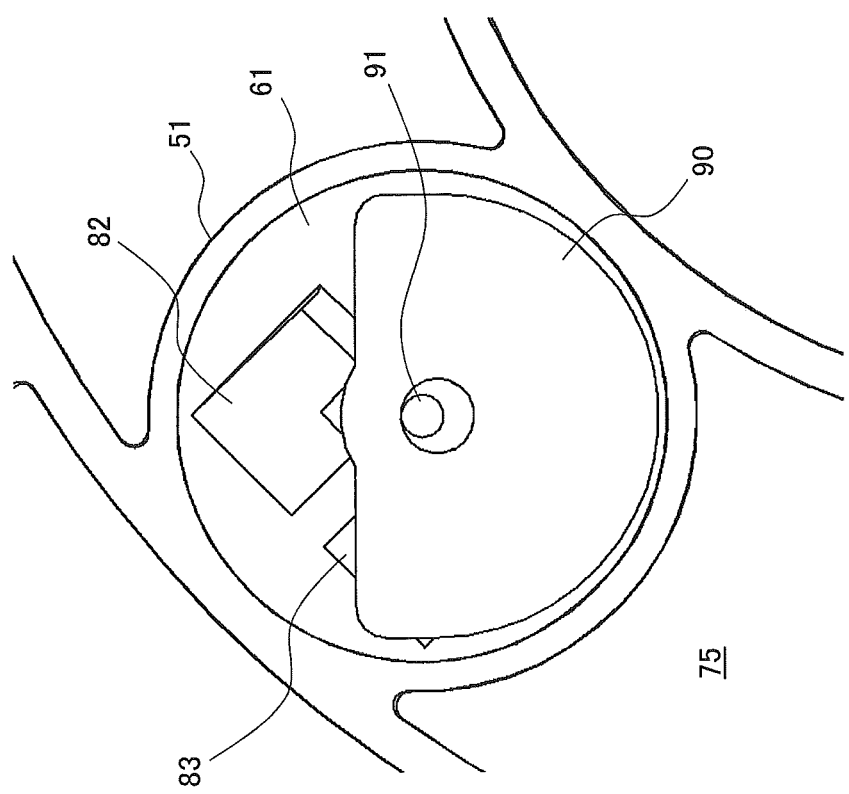
FIG. 8 is an enlarged view showing the first region where the plate member is included and its surroundings.

As shown in FIG. 8, half-moon plate member 90 capable of covering roughly a half of region 61 is disposed on the front side of region 61. Plate member 90 is rotatably held by rotary shaft 91 located at the center of region 61 and parallel to the center axis of light-emitting tube 22.

As shown in FIG. 7, sealing unit port 81 is disposed between rotary shaft 91 and light-emitting tube 22. In other words, sealing unit port 81 is located inside rotary shaft 91. On the other hand, valve ports 82 and 83 are located outside rotary shaft 91. Further, sealing unit port 81 is located on a straight line connecting the center of rotary shaft 91 with the center of light-emitting tube 22. On the other hand, valve port 82 and valve port 83 are located line-symmetrically with the straight line set as a symmetrical axis.

With this structure, plate member 90 rotates under its own weight according to the posture of projection display device 1 to selectively open/close the plurality of ports. The selective opening/closing of the ports will be described below in detail.

Figure 9:
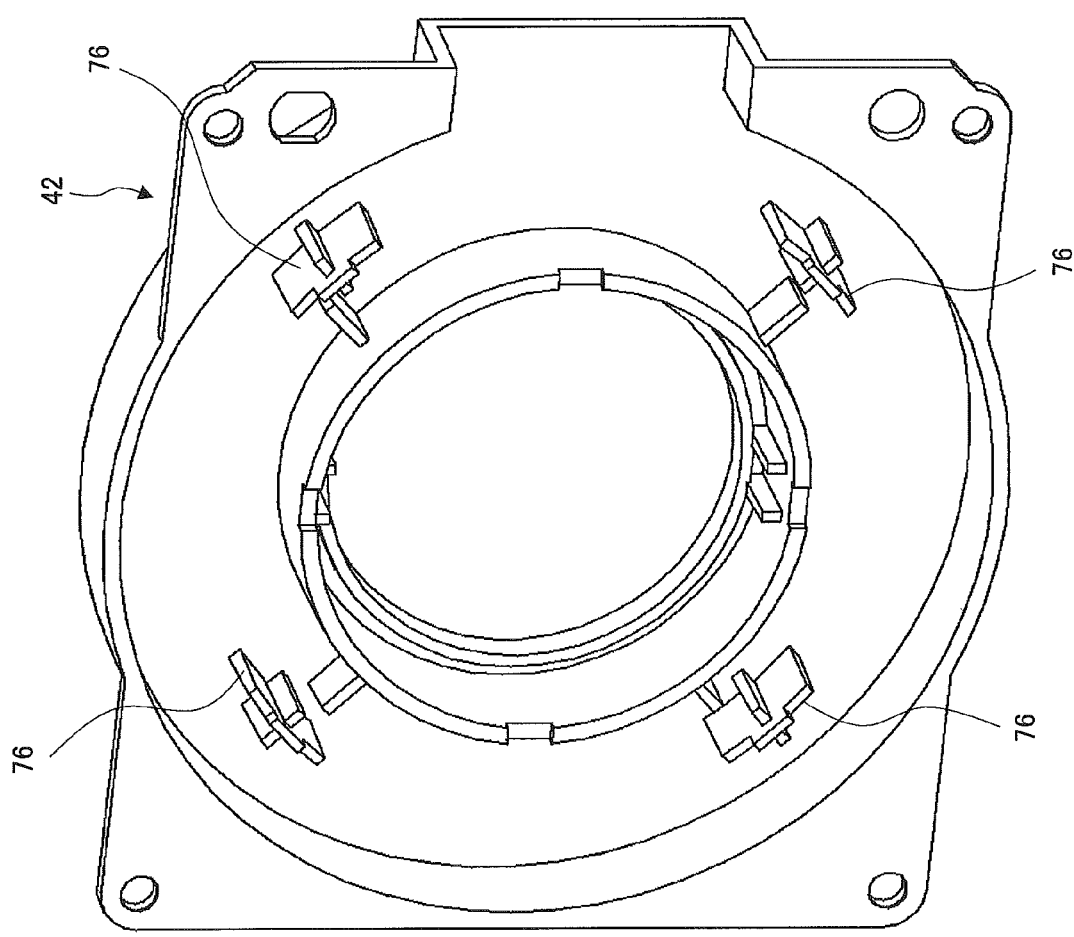
FIG. 9 is a perspective view showing a duct member rear surface.
Figure 10:
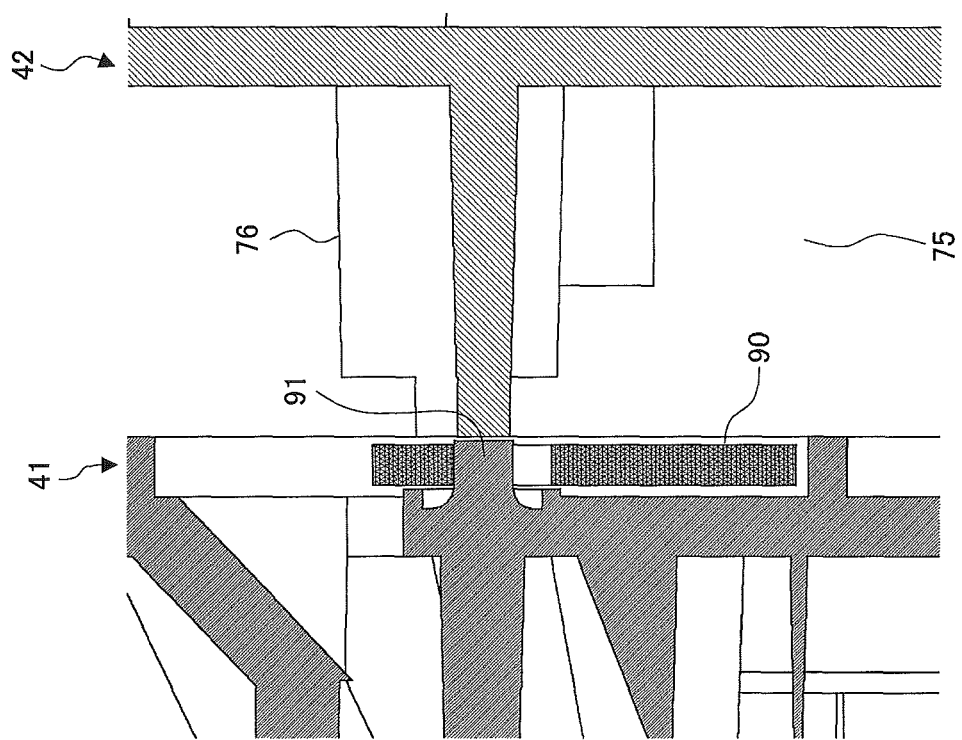
FIG. 10 is a sectional view showing a guide rib and its surroundings.

As shown in FIG. 9, four guide ribs 76 are arranged on the rear surface of duct member 42 facing the front face of holder 41. The positions of guide ribs 76 respectively correspond to the positions of regions 61 to 64. As shown in FIG. 10, a part of the end surface of guide rib 76 abuts on the end surface of rotary shaft 91 to prevent removal of plate member 90. The other part of the end surface of guide rib 76 faces the front face of holder 41 with a predetermined space to guide rotation of plate member 90.

Next, the opened/closed state of the port according to the posture change of projection display device 1 will be described. To facilitate understanding, the posture change of projection display device 1 will be described first referring to FIG. 11.

Figure 11:
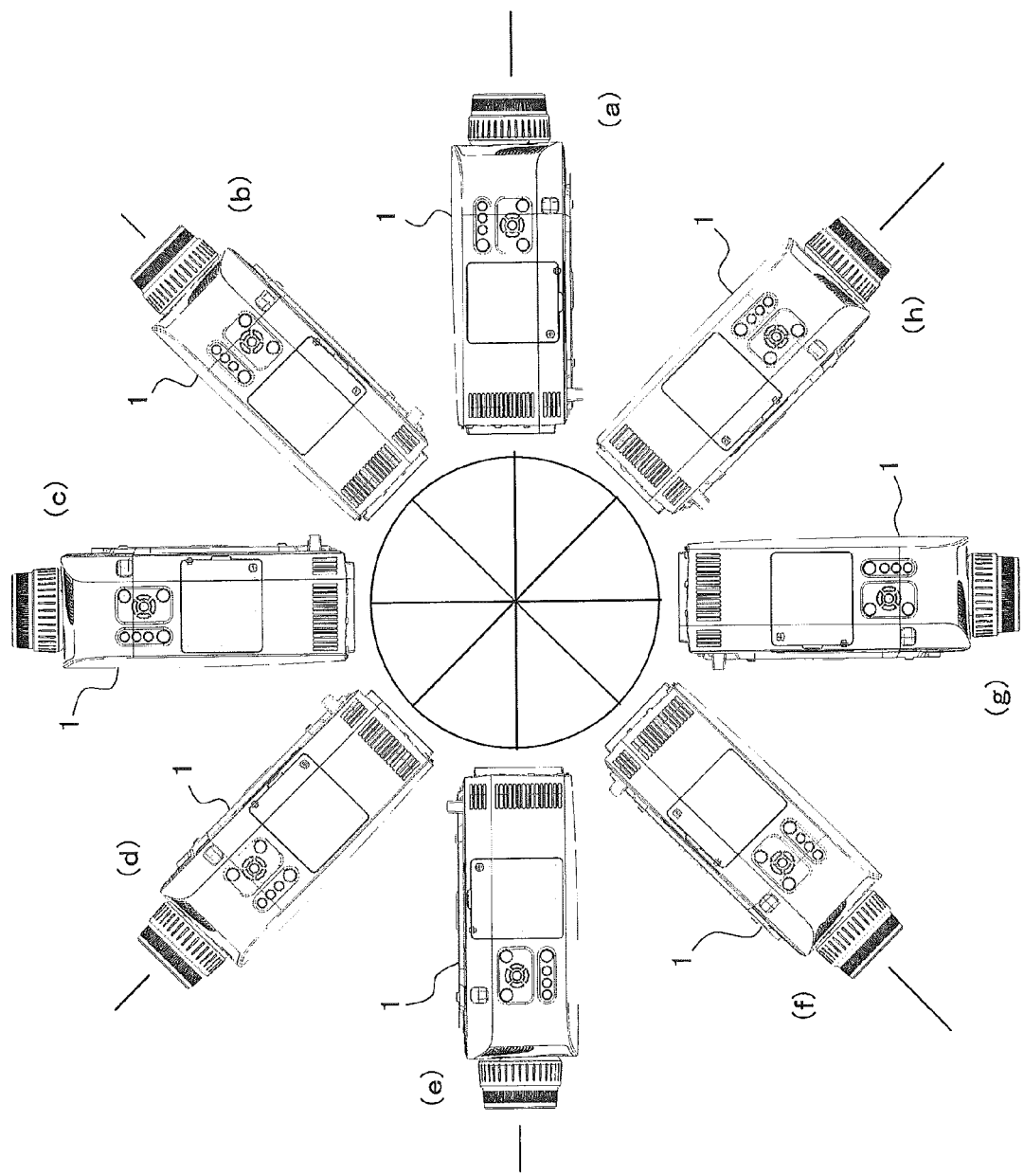
FIG. 11 is side views each showing the posture change of the projection display device.

Projection display device 1 is rotated by 360° anticlockwise from a state shown in (a) of FIG. 11. The rotational angle of projection display device 1 shown in (a) of FIG. 11 is 0°, and the rotational angle of projection display device 1 shown in (b) of FIG. 11 is 45°. Similarly, the rotational angle of projection display device 1 shown in (c) of FIG. 11 is 90°, the rotational angle of projection display device 1 shown in (d) of FIG. 11 is 135°, the rotational angle of projection display device 1 shown in (e) of FIG. 11 is 180°, the rotational angle of projection display device 1 shown in (f) of FIG. 11 is 225°, the rotational angle of projection display device 1 shown in (g) of FIG. 11 is 270°, and the rotational angle of projection display device 1 shown in (h) of FIG. 11 is 315°.

Figure 12:
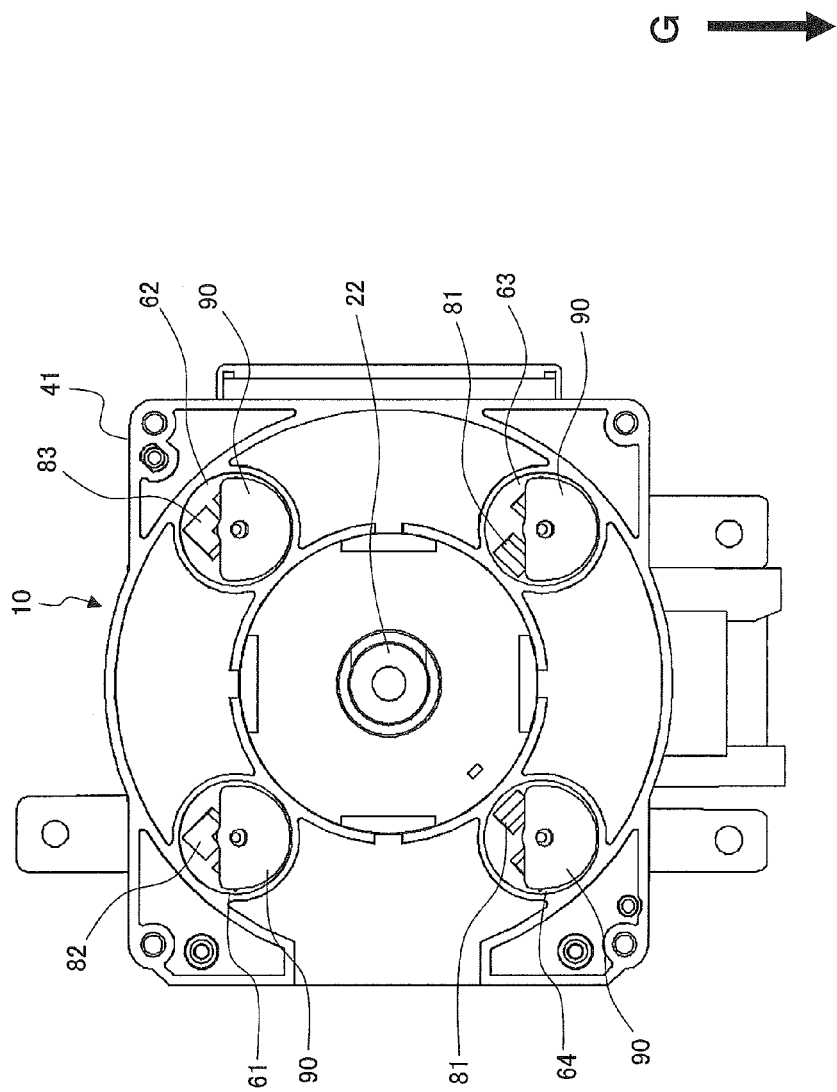
FIG. 12 is a plan view showing the opened/closed state of a port when the rotational angle of the projection display device is 0°.

FIG. 12 is a plan view showing the opened/closed state of the port when projection display device 1 is in the state shown in (a) of FIG. 11. Arrow G shown in each of FIGS. 12 to 23 indicates the direction of gravity.

As shown in FIG. 12, when the rotational angle of projection display device 1 is 0°, first region 61 and second region 62 are located above third region 63 and fourth region 64 in the direction of gravity. In first region 61, sealing unit port 81 and valve port 83 are closed by plate member 90, and only valve port 82 is opened. In second region 62, sealing unit port 81 and valve port 82 are closed by plate member 90, and only valve port 83 is opened. In third region 63 and fourth region 64, valve ports 82 and 83 are closed by plate member 90, and only sealing unit port 81 is opened.

Figure 13:
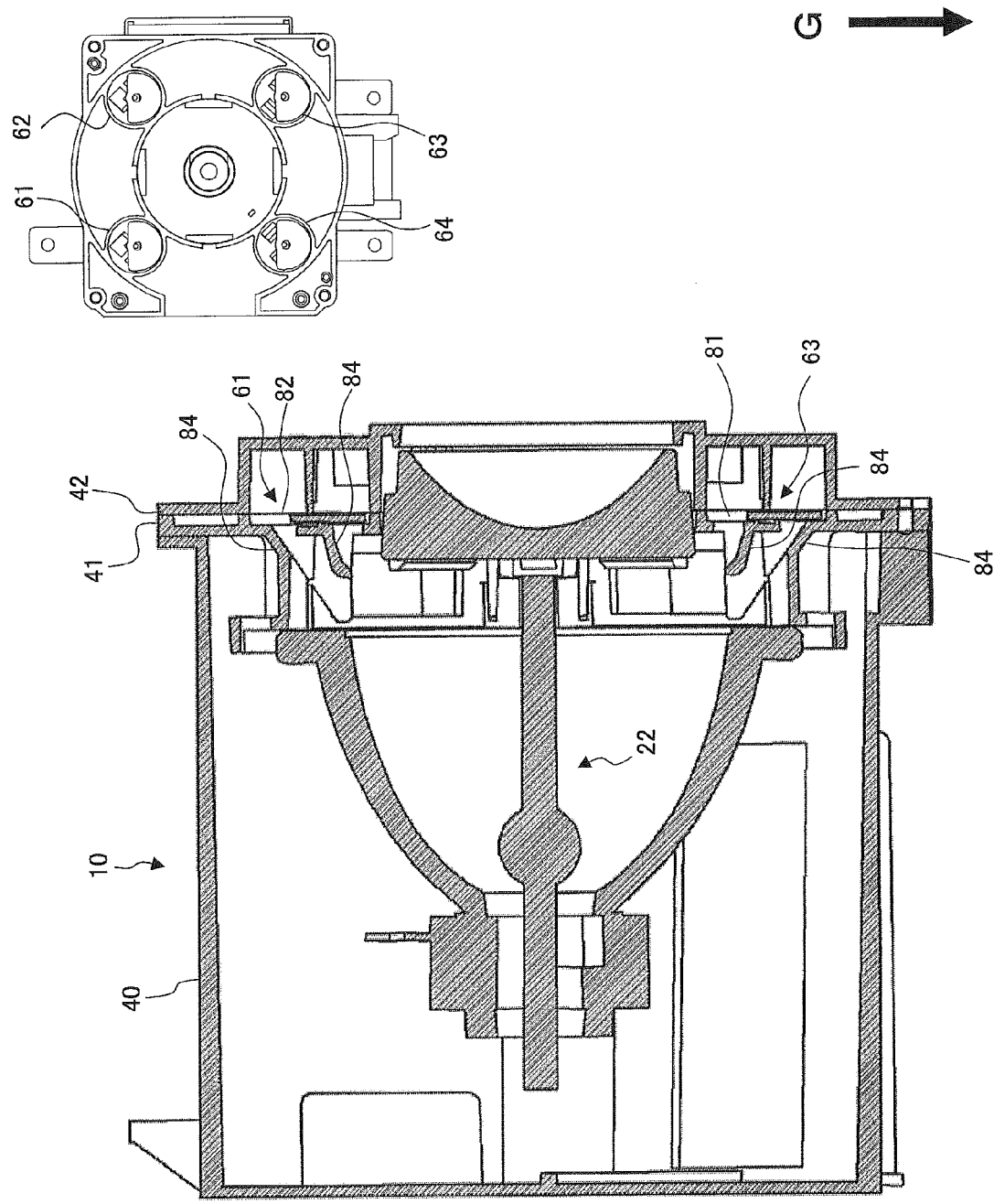
FIG. 13 is a sectional view showing the opened/closed state of the port when the rotational angle of the projection display device is 0°.

As shown in FIG. 13, flow rectifying plate 84 is disposed on the rear side of each of regions 61 to 64. More specifically, flow rectifying plate 84 inclined downward toward valve 22 is located between sealing unit port 81 and valve ports 82 and 83. Accordingly, cooling air entered from valve port 82 of first region 61 and valve port 83 (FIG. 12) of second region 62 is guided by flow rectifying plate 84 to be concentratedly supplied to the valve upper part.

Figure 14:
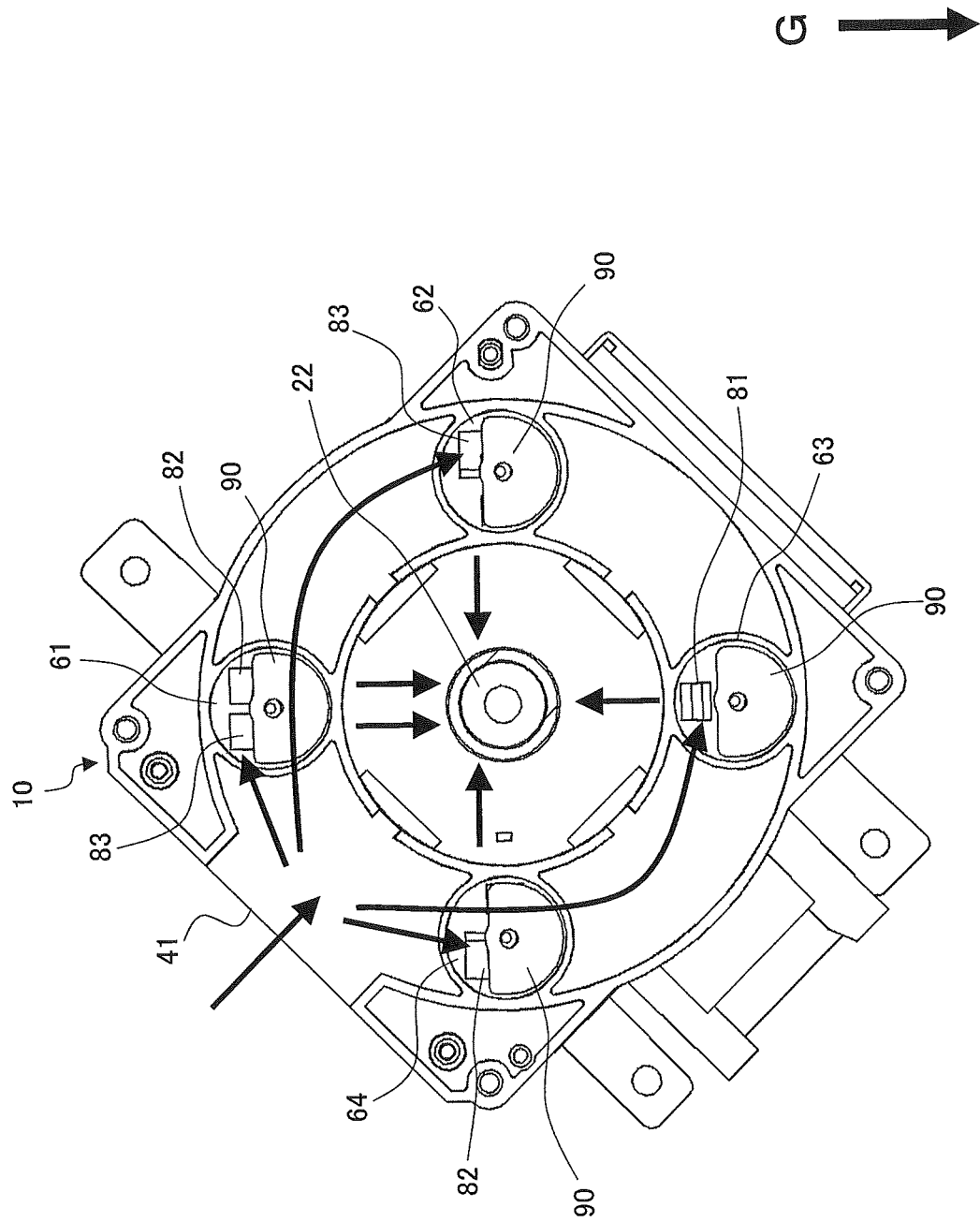
FIG. 14 is a plan view showing the opened/closed state of the port when the rotational angle of the projection display device is 45°.
Figure 15:
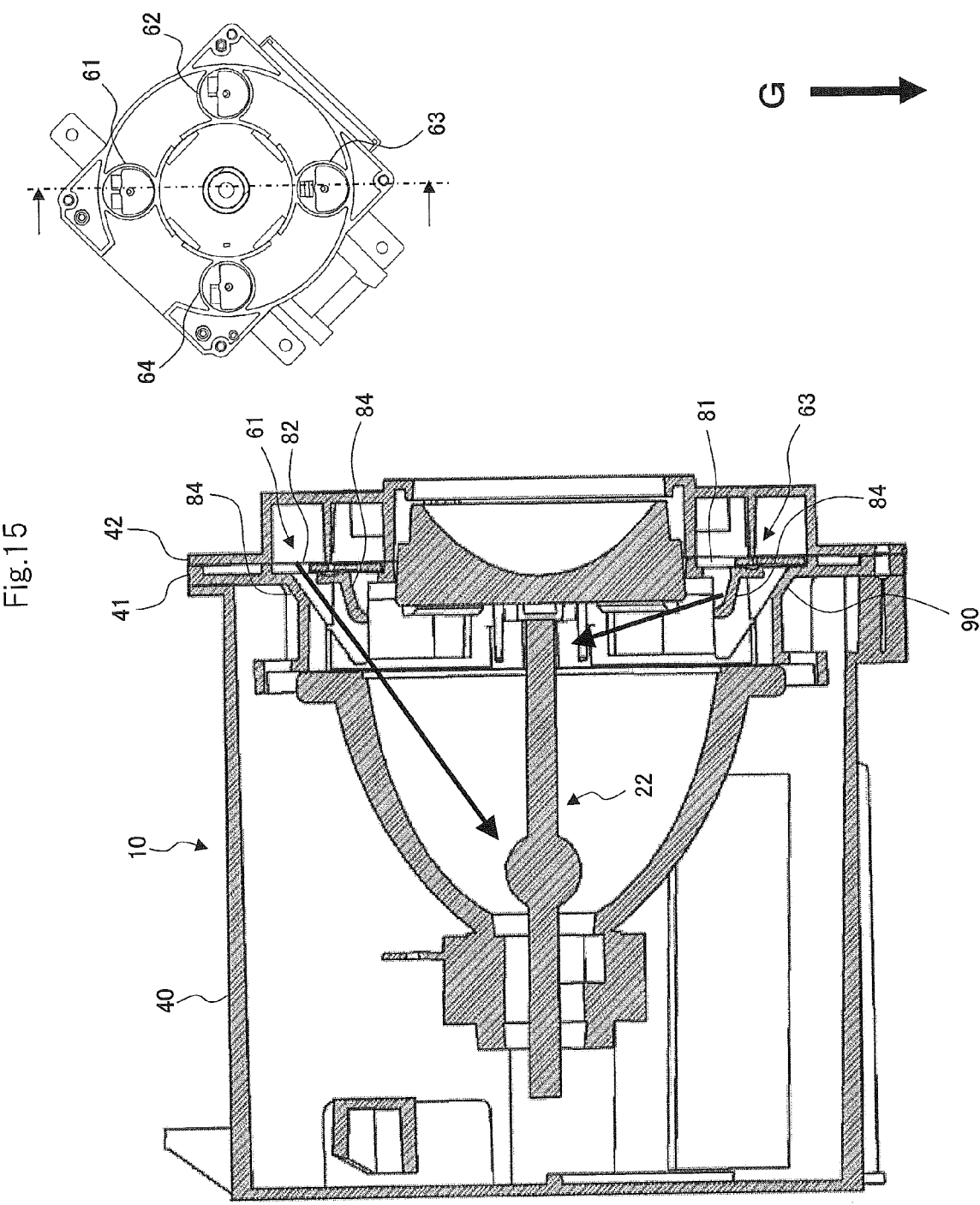
FIG. 15 is a sectional view showing the opened/closed state of the port when the rotational angle of the projection display device is 45°.
Figure 16:
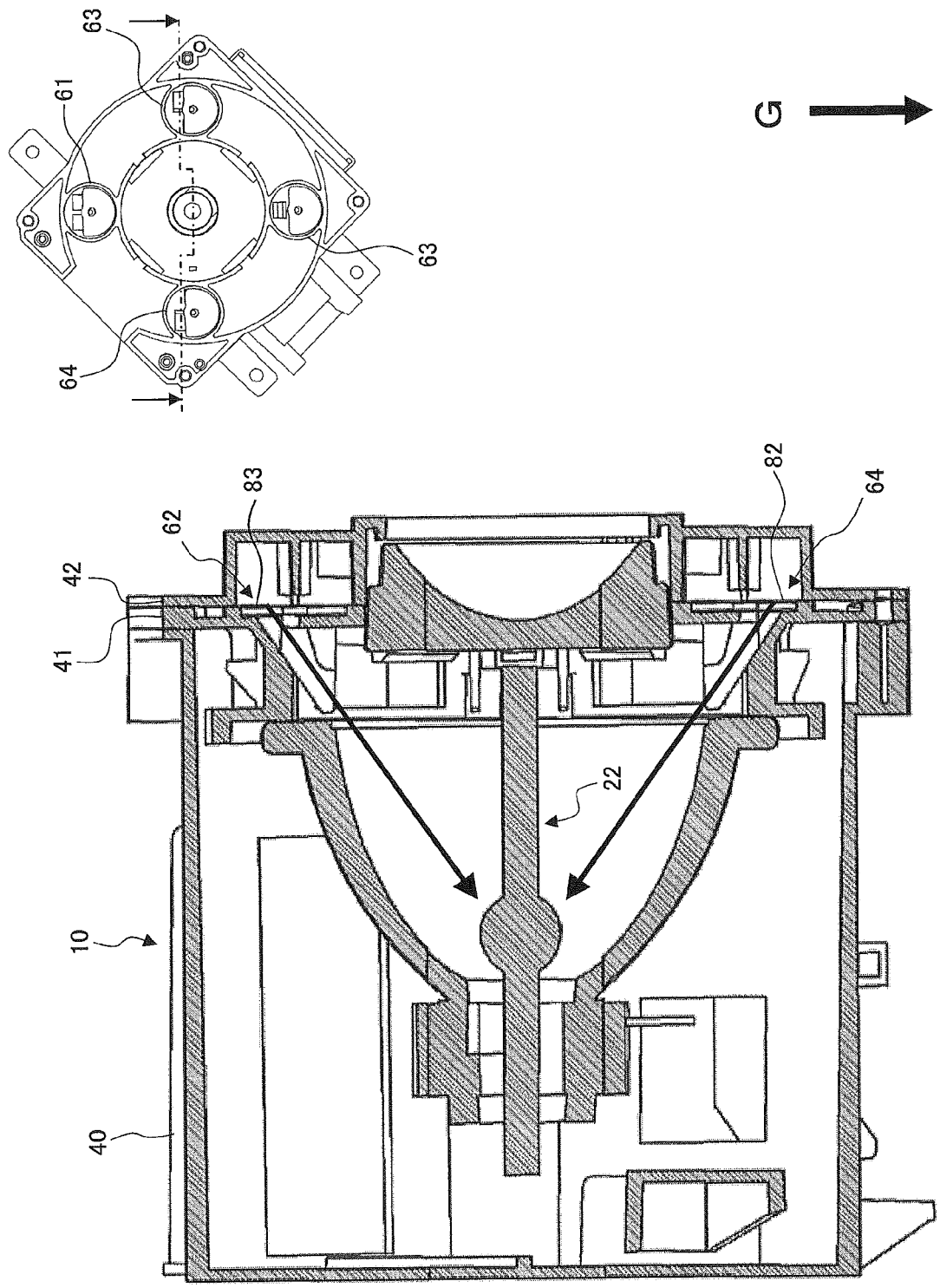
FIG. 16 is another sectional view showing the opened/closed state of the port when the rotational angle of the projection display device is 45°.

FIG. 14 is a plan view showing the opened/closed state of the port when projection display device 1 is in the state shown in (b) of FIG. 11. As shown in FIG. 14, when the rotational angle of projection display device 1 is 45°, among the four regions, first region 61 is at a highest position in the direction of gravity. In first region 61, sealing unit port 81 is closed by the plate member, and valve ports 82 and 83 are opened. In second region 62, sealing unit port 81 and valve port 82 are closed by plate member 90, and only valve port 83 is opened. In fourth region 64, sealing unit port 81 and valve port 83 are closed by plate member 90, and only valve port 82 is opened. In third region 63, valve ports 82 and 83 are closed by plate member 90, and only sealing unit port 81 is opened. Accordingly, as shown in FIG. 15, the valve upper part is concentratedly cooled by cooling air entered from valve ports 82 and 83 of first region 61 (only valve port 82 is shown FIG. 15). Further, as shown in FIG. 16, the vicinity of the valve upper part is cooled by cooling air entered from valve port 83 of second region 62 and valve port 82 of the fourth region.

Figure 17:
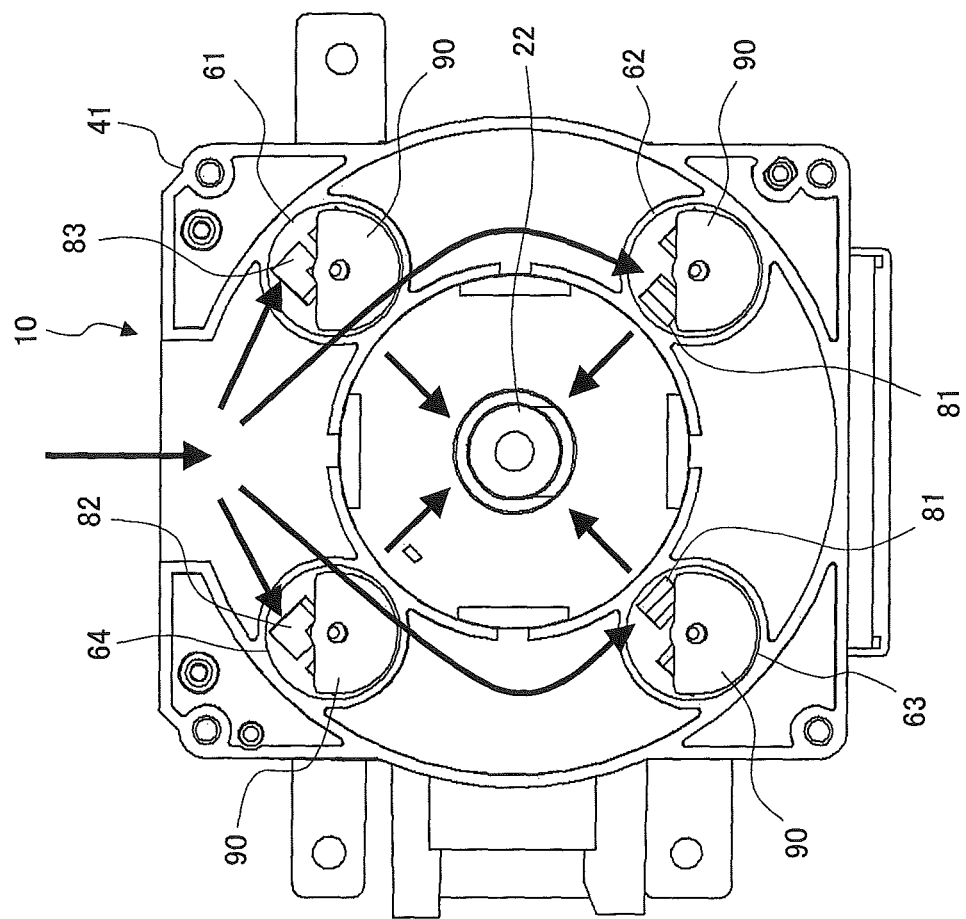
FIG. 17 is a plan view showing the opened/closed state of the port when the rotational angle of the projection display device is 90°.

FIG. 17 is a plan view showing the opened/closed state of the port when projection display device 1 is in the state shown in (c) of FIG. 11. As shown in FIG. 17, when the rotational angle of projection display device 1 is 90°, fourth region 64 and first region 61 are located above second region 62 and third region 63 in the direction of gravity. In fourth region 64, sealing unit port 81 and valve port 83 are closed by plate member 90, and only valve port 82 is opened. In first region 61, sealing unit port 81 and valve port 82 are closed by plate member 90, and only valve port 83 is opened. In second region 62 and third region 63, valve ports 82 and 83 are closed by plate member 90, and only sealing unit port 81 is opened. Accordingly, the valve upper part is concentratedly cooled by cooling air entered from valve port 82 of fourth region 64 and valve port 83 of first region 61.

Figure 18:
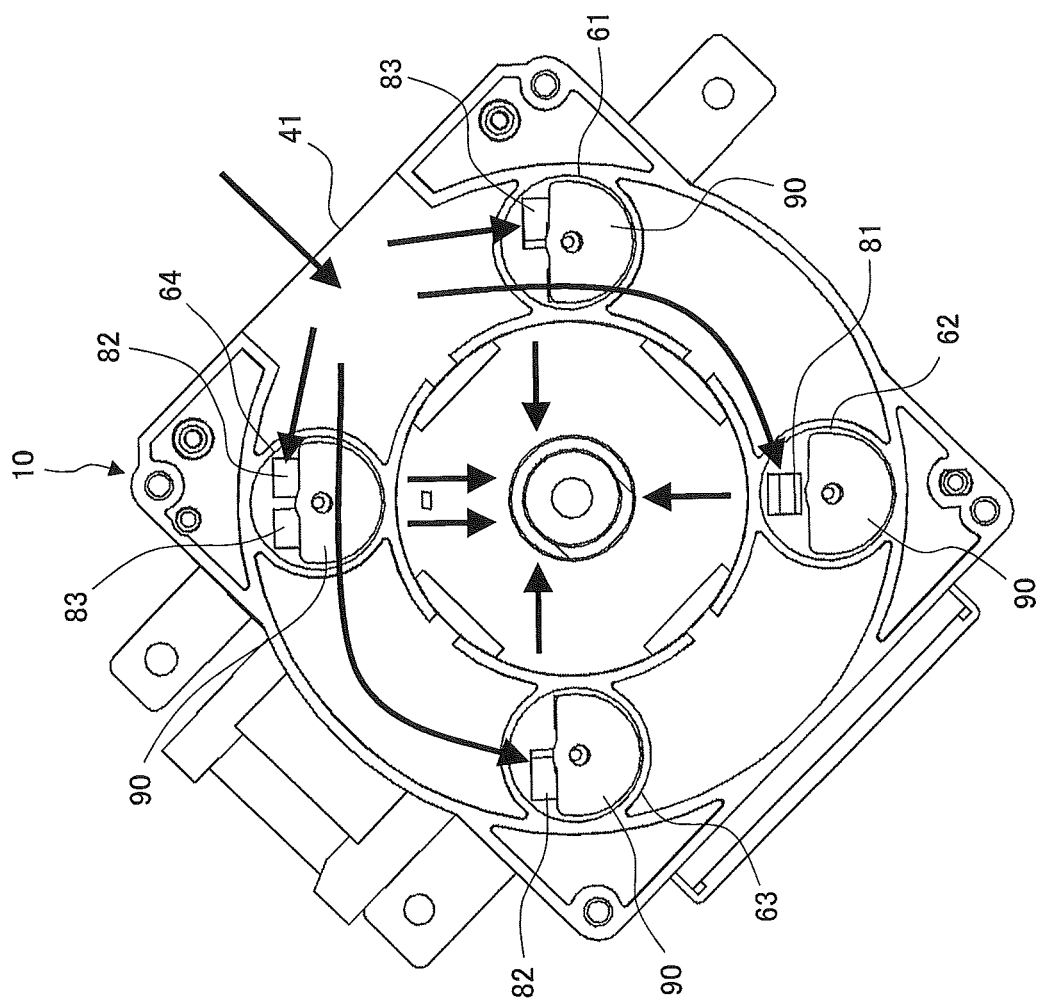
FIG. 18 is a plan view showing the opened/closed state of the port when the rotational angle of the projection display device is 135°.

FIG. 18 is a plan view showing the opened/closed state of the port when projection display device 1 is in the state shown in (d) of FIG. 11. As shown in FIG. 18, when the rotational angle of projection display device 1 is 135°, among the four regions, fourth region 64 is at a highest position in the direction of gravity. In fourth region 64, sealing unit port 81 is closed by plate member 90, and valve ports 82 and 83 are opened. In first region 61, sealing unit port 81 and valve port 82 are closed by plate member 90, and only valve port 83 is opened. In third region 63, sealing unit port 81 and valve port 83 are closed by plate member 90, and only valve port 82 is opened. In second region 62, valve ports 82 and 83 are closed by plate member 90, and only sealing unit port 81 is opened. Accordingly, the valve upper part is concentratedly cooled by cooling air entered from valve ports 82 and 83 of fourth region 64. Further, the vicinity of the valve upper part is cooled by cooling air entered from valve port 83 of first region 61 and valve port 82 of third region 63.

Figure 19:
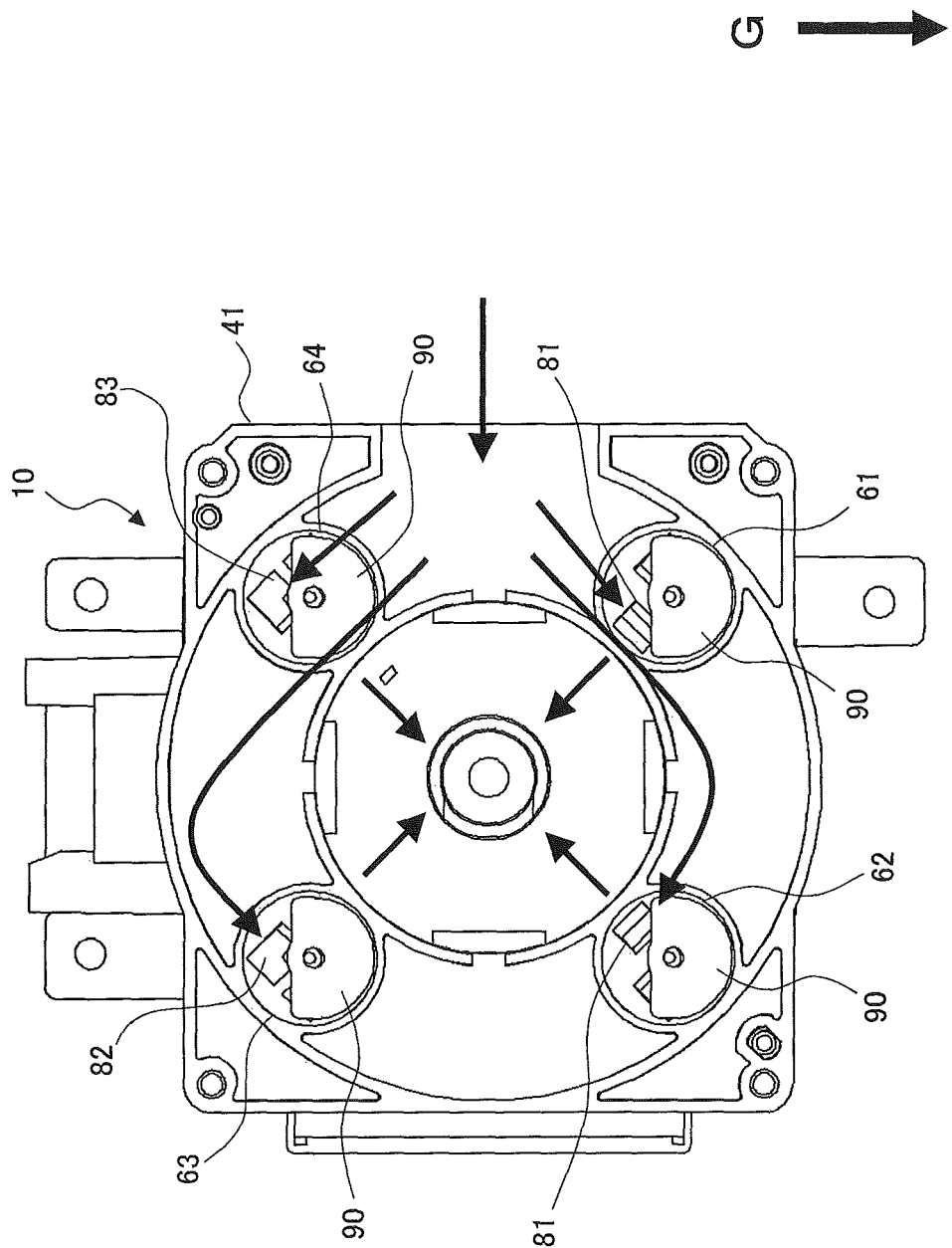
FIG. 19 is a plan view showing the opened/closed state of the port when the rotational angle of the projection display device is 180°.

FIG. 19 is a plan view showing the opened/closed state of the port when projection display device 1 is in the state shown in (e) of FIG. 11. As shown in FIG. 19, when the rotational angle of projection display device 1 is 180°, third region 63 and fourth region 64 are located above first region 61 and second region 62 in the direction of gravity. In third region 63, sealing unit port 81 and valve port 83 are closed by plate member 90, and only valve port 82 is opened. In fourth region 64, sealing unit port 81 and valve port 82 are closed by plate member 90, and only valve port 83 is opened. In first region 61 and second region 62, valve ports 82 and 83 are closed by plate member 90, and only sealing unit port 81 is opened. Accordingly, the valve upper part is concentratedly cooled by cooling air entered from valve port 82 of third region 63 and valve port 83 of fourth region 63.

Figure 20:
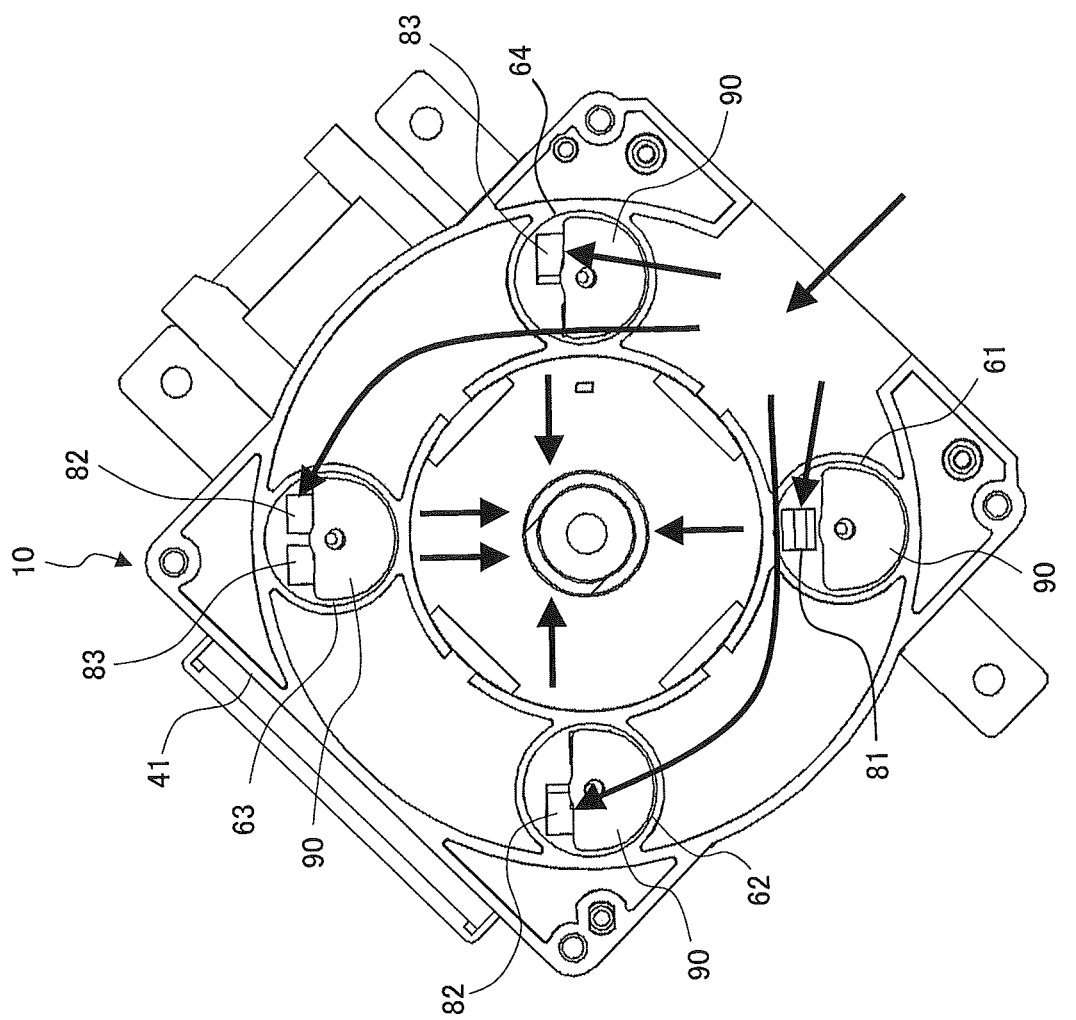
FIG. 20 is a plan view showing the opened/closed state of the port when the rotational angle of the projection display device is 225°.

FIG. 20 is a plan view showing the opened/closed state of the port when the projection display device is in the state shown in (f) of FIG. 11. As shown in FIG. 20, when the rotational angle of projection display device 1 is 225°, among the four regions, third region 63 is at the highest position in the direction of gravity. In third region 63, sealing unit port 81 is closed by plate member 90, and valve ports 82 and 83 are opened. In fourth region 64, sealing unit port 81 and valve port 82 are closed by plate member 90, and only valve port 83 is opened. In second region 62, sealing unit port 81 and valve port 83 are closed by plate member 90, and only valve port 82 is opened. In first region 61, valve ports 82 and 83 are closed by plate member 90, and only sealing unit port 81 is opened. Accordingly, the valve upper part is concentratedly cooled by cooling air entered from valve ports 82 and 83 of third region 63. Further, the vicinity of the valve upper part is cooled by cooling air entered from valve port 83 of fourth region 64 and valve port 82 of second region 62.

FIG. 21 is a plan view showing the opened/closed state of the port when projection display device 1 is in the state shown in (g) of FIG. 11. As shown in FIG. 21, when the rotational angle of projection display device 1 is 270°, second region 62 and third region 63 are located above fourth region 64 and first region 61 in the direction of gravity. In second region 62, sealing unit port 81 and valve port 83 are closed by plate member 90, and only valve port 82 is opened, third region 63, sealing unit port 81 and valve port 82 are closed by plate member 90, and only valve port 83 is opened. In fourth region 64 and first region 61, valve ports 82 and 83 are closed by plate member 90, and only sealing unit port 81 is opened. Accordingly, the valve upper part is concentratedly cooled by cooling air entered from valve port 82 of second region 62 and valve port 83 of third region 63.

FIG. 22 is a plan view showing the opened/closed state of the port when projection display device 1 is in the state shown in (h) of FIG. 11. As shown in FIG. 22, when the rotational angle of projection display device 1 is 315°, among the four regions, second region 62 is at the highest position in the direction of gravity. In second region 62, sealing unit port 81 is closed by plate member 90, and valve ports 82 and 83 are opened. In third region 63, sealing unit port 81 and valve port 82 are closed by plate member 90, and valve port 83 is opened. In first region 61, sealing unit port 81 and valve port 83 are closed by plate member 90, and only valve port 82 is opened. In fourth region 64, valve ports 82 and 83 are closed by plate member 90, and only sealing unit port 81 is opened. Accordingly, the valve upper part is concentratedly cooled by cooling air entered from valve ports 82 and 83 of second region 62. Further, the vicinity of the valve upper part is cooled by cooling air entered from valve port 83 of third region 63 and valve port 82 of first region 61.

Thus, whatever posture projection display device 1 is in, the valve upper part is concentratedly cooled, and the temperature of the entire valve is uniformly maintained.

What is claimed is:

1. A light source device including a lamp unit that includes a light-emitting tube for emitting light by arc discharge and a reflector surrounding the light-emitting tube, the light source device comprising:
    a holder that closes an opening of the reflector and holds the lamp unit;
    a duct member placed over a front face of the holder;
    a flow path which is formed between the front face of the holder and a rear surface of the duct member and through which cooling air is supplied;
    a plurality of port groups disposed in the holder, each port group including two or more ports for connecting an inside of the reflector with the flow path; and
    a plate member disposed in each port group and configured to selectively open/close the two or more ports included in each port group,
    wherein:
    the plurality of port groups is located around a center axis of the light-emitting tube to surround the center axis; and
    the plate member rotates under its own weight according to a posture change of the light source device to open some of the two or more ports included in the port group while closing the other ports;
    further comprising a rotary shaft that supports the plate member and is parallel to the center axis of the light-emitting tube,
    wherein the two or more ports included in the port group include a port located inside the rotary shaft and between the rotary shaft and the center axis, and a port located outside the rotary shaft;
    the light source device further comprising:
    a first port located inside the rotary shaft; and
    a second port and a third port located outside the rotary shaft,
    wherein:
    the first port is located on a straight line connecting a center of the center axis with a center of the rotary shaft; and
    the second port and the third port are symmetrically located with the straight line set as a symmetrical axis.

2. The light source device according to claim 1, wherein in a rear surface of the holder, a flow rectifying plate is disposed to guide cooling air entered from the port toward the light-emitting tube.

3. The light source device according to claim 1, wherein the number of port groups is four, and the port groups are arranged at equal intervals around the center axis of the light-emitting tube.

4. The light source device according to claim 1, further comprising a plurality of ring-shaped ribs arranged in the front face of the holder,
    wherein the port group and the plate member are arranged inside each rib.

5. The light source device according to claim 1, wherein in a rear surface of the duct member, a guide rib is disposed to guide rotation of the plate member.

6. A projection display device comprising:
    a light source device;
    modulation means for modulating light emitted from the light source device; and
    a projection lens for projecting the light modulated by the modulation means,
    wherein:
    the light source device comprises the light source device according to claim 1; and
    the center axis of the light-emitting tube included in the light source device is orthogonal to an optical axis of the projection lens.

7. The projection display device according to claim 6, further comprising:
    a blower; and
    a connection flow path for connecting the blower to the flow path of the light source device.

* * * * *